Patented Dec. 24, 1946

2,413,009

UNITED STATES PATENT OFFICE 2,413,009

PROCESSES OF REFINING, PURIFYING, AND HYDROGENATING FATS, FATTY ACIDS, AND WAXES

Ilona Taussky, New York, N. Y.

No Drawing. Application October 6, 1943, Serial No. 505,254

8 Claims. (Cl. 260—97.5)

My present invention relates to processes of refining and purifying fats, fatty acids and waxes, fatty matters of mixed composition, like tall oil, to methods of pre-treating such fats for hydrogenation purposes, and to processes of hydrogenating them.

Many attempts have been made in the past to refine tall oil, a by-product of sulphate or kraft paper pulp manufacture, and a particularly rich source thereof is from coniferous woods originating in the southern part of the United States. Tall oil is obtained by acidification and other treatment of the black liquor soap which is salted out and rises to the surface of the black liquor on standing, and is composed preponderantly of higher fatty acids and resin acids which together make up about 80 to 90 percent of its weight. The balance consists of coloring substances (oxidized resin acids) and unsaponifiable matter.

It is obvious that unpurified crude tall oil having a dark color is unusable for many purposes, since the color caused by the impurities of the oil is a great handicap in many fields, as for instance in soap making. Furthermore, crude tall oil as well as many other undistilled fats, waxes, fatty acids and fatty oils containing fatty acids present great difficulties for hydrogenation on account of their impurities. The large percentage of catalyst, mainly nickel catalyst, needed for hydrogenation of undistilled fatty acids, as crude tall oil, makes hydrogenation of such acids uneconomical; besides, hydrogenation of such acids has to be carried out at a relatively high reaction temperature which is not advisable in ordinary steel vessels used for such purposes.

Furthermore, undistilled tall oil as well as undistilled mixed fatty acids, e. g., from the so-called Twitchell splitting process as well as other higher fatty acids contain a relatively high percentage of moisture and therefore it takes a relatively long time to dry and bleach such oils and acids if the usual percentage of filter material is used; this disadvantage can be avoided by using a larger amount of filter material which however makes the whole process uneconomical.

It is therefore an object of my present invention to provide new methods of drying, bleaching and purifying fats, waxes and fatty acids, particularly undistilled higher fatty acids and their mixtures, as for instance tall oil, in one economical step in a much shorter time than that needed for any process known at present.

It is a further object of my present invention to carry out this drying, bleaching and purifying at such temperatures as to enable use of ordinary steel vessels without impairing the same.

Another very important object of my present invention consists in substantially reducing the amount of activated catalyst needed for hydrogenation purposes by pretreating the fats, waxes and fatty acids, particularly tall oil, in a certain, entirely new way.

Still another object of my present invention consists in new processes of refining fats, waxes and higher fatty acids, such as tall oil, obtaining thereby a relatively high colored, refined product containing only traces of impurities.

Still a further object of my present invention consists in new methods of removing metal soaps, e. g., nickel and copper soaps, colloidal metal residues, e. g., colloidal nickel and copper impurities, and also iron traces from the purified and/or hydrogenated fats, waxes and fatty acids and oils containing fatty acids.

Still another object of my present invention consists in new hydrogenation processes which might be carried out at relatively low temperatures under a relatively low pressure with a relatively small amount of a catalyst.

With the above objects in view, my present invention mainly consists in a process of refining fats, waxes and fatty acids characterized by subjecting an intimate mixture of a fat, wax or fatty acid, for instance tall oil, and a small percentage of a finely divided metal catalyst to pressure at an elevated temperature. I preferably mix the tall oil to be purified with a small percentage of a spent metal catalyst, e. g., a spent nickel or nickel-copper catalyst, and then subject the thus obtained mixture to hydrogen pressure at a temperature above 212° F., preferably at a temperature slightly above 212° F.

I have found that addition of the spent catalyst in combination with subjecting the mixture to hydrogen pressure at a temperature slightly above 212° F. produces the required bleaching and purifying effects within a surprisingly short time without the necessity of raising the temperature during this process to one which is not advisable in the ordinary steel vessels customarily used. Furthermore, I have found that this new pre-treatment makes it possible to substantially decrease the amount of activated catalyst needed for the consecutive hydrogenation, thereby making hydrogenation of such substances possible which up to now could not be economically hydrogenated because of the high costs caused by the relatively large amounts of catalyst needed therefor.

It is advantageous to use a hydrogen pressure of between 50 and 750 pounds and to agitate the mixture while it is under this pressure and at a temperature of about 220° to 225° F. I have also found it advantageous to add to the mixture before the hydrogen pressure and heat treatment a small percentage of a bleaching agent, e. g., from one percent to five percent of activated earth and about one percent of activated carbon. Addition of these agents substantially decreases the amount of formed nickel or other metal soaps so that removal of these soaps by consecutive treatments will be either entirely unnecessary or substantially facilitated.

Of course, the percentages of the bleaching and purifying ingredients used for the purposes of the present invention might be varied between relatively wide limits depending on the composition and characteristics of the treated materials. Thus, for instance, I have found that best results might be obtained in the process of purifying crude tall oil if the same is mixed with about one percent to five percent of activated earth, about one percent of activated carbon, and about two to five percent of spent metal catalysts, preferably spent nickel or nickel-copper catalysts. I may also add a small percentage, e. g., about one percent, of inactivated kieselguhr which is also called filtercel, which addition serves as carrier for the impurities during precipitation, thereby facilitating removal of the same. I wish to note that if the spent catalyst used for my process contains already used filter material, no fresh filtercel, kieselguhr or activated carbon have to be added separately.

Of course, for refining and bleaching other fatty acids the percentages of added agents have to be varied; thus for instance I have found that undistilled cotton oil fatty acid and undistilled oleic acid and similar acids may be refined by mixing them with about one percent to two percent of a spent catalyst, about one quarter of a percent to three quarters of a percent of activated earth, about one quarter to three quarters of a percent of filtercel, and about one quarter of a percent of activated carbon, and then treating the thus obtained mixture in the same way as explained above, with the only difference that a hydrogen pressure of not more than 50 pounds has to be applied.

The above described treatment of the undistilled fatty acids, as for instance tall oil, will result in substantial bleaching and refining of the acids; however, the same will still contain the metal soaps formed by the above described treatment with the spent catalyst. These metal soaps, particularly nickel and/or copper soaps, are then removed by a subsequent treatment with diluted phosphoric acid and/or sodium phosphate. If the thus refined higher fatty acids are not to be subjected to hydrogenation, they can then be considered bleached and purified and stable enough to be used for soap making or for drying oil esterification purposes without the disadvantage of color reversion which even occurs when distilled fatty acids are used.

A further effect of subjecting the pre-treated fatty acids to a subsequent treatment with phosphoric acid and/or sodium phosphate is the complete removal of the last traces of sulphur impurities which are injurious and inhibit any catalytic reaction to which the refined and purified acids might be subjected, e. g., for hydrogenation purposes. I have found that acids and oils treated in the way described above react much faster during subsequent catalytic reaction and that much less catalyst is needed for such a reaction than if the acids and oils are not subjected to phosphoric acid and/or sodium phosphate treatment.

The thus purified fatty acids still contain iron traces. In accordance with my present invention the same may be removed by treatment with an organic acid, e. g., by addition of traces, e. g., about 0.01% of acetic, citric or oxalic acid. This refining step might then be followed by bleaching with fuller's earth and activated carbon.

The fatty acids refined as described above may then be subjected to a hydrogenation process. The single process steps of my new hydrogenation process are similar to those customary with the main difference that the amount of activated catalyst, the reaction temperature and the reaction pressure can be substantially reduced; thus, for instance, it is possible to reduce the amount of activated catalyst to about one percent of the refined higher fatty acids. In view of the fact that the cost of this activated live catalyst is the factor which decides the cost of the final hydrogenated product, it is of extreme importance to reduce the amount needed for hydrogenation as far as possible. Since all known hydrogenation processes require several times as much catalyst as the present method, this my new method is the first to make hydrogenation of undistilled higher fatty acids, particularly of tall oil, economical and feasible on a commercial scale. It is also possible, as mentioned above, to reduce the reaction temperature and pressure during hydrogenation; thus very good results can be obtained by hydrogenating at a temperature slightly above 212° F. and under a pressure of 750 pounds or less.

In this connection, I wish to mention that an important improvement of my new process consists not only in pre-treating the acids in the way described above and claimed in the following claims, but also in carrying the hydrogenation process out in a certain new way, namely by means of a mixed copper-nickel catalyst consisting preferably of about fifty to eighty percent of nickel and about fifty to twenty percent of copper. According to my observations, this catalyst is particularly effective by combined action of the copper and nickel ingredients, namely the copper particles of the catalyst absorb those impurities of the fatty acid to be hydrogenated, e. g., of tall oil, which inhibit the catalyst action, and the nickel particles of the catalyst then freely react with the thus purified fatty acid. Some crude tall oils and other undistilled fatty acids will respond to a catalyst of this type even without any pre-treatment. Therefore, I wish to stress that use of such a catalyst for hydrogenation purposes, particularly for hydrogenation of undistilled fatty acids such as tall oil or the like constitutes in itself an important improvement, independently from any pre-treatment described above. Of course, combination of this new catalyst during hydrogenation with my above described new purifying and bleaching pre-treatment is particularly advantageous and gives exceptionally good and economical results, since this combined process results not only in very light colored hydrogenated products but also reduces still further the amount of activated catalyst needed for hydrogenation purposes.

The thus hydrogenated fatty acids might still contain some traces of metal soaps, e. g., nickel and copper soaps; they might also contain colloidal nickel and/or copper impurities caused by the hydrogenation treatment; finally they may also contain traces of iron if they are treated in iron vessels. To remove these metals and metal soaps, the hydrogenated fatty acids are again subjected to treatment with phosphoric acid and/or sodium phosphate which remove the metal soaps and the colloidal metals and with an organic acid, e. g., acetic, citric or oxalic acid, to remove the iron traces. This latter treatment might then finally be followed by subsequent bleaching with fuller's earth and activated carbon.

I wish to stress that, as stated above, my present invention relates to processes of refining and purifying fats, for instance oils of vegetable origin, cotton seed oil, linseed oil and soyabean oil and oils of animal origin, for instance whale oil, tallow, and hog fat; it also relates to refining and purifying of waxes of animal origin as sperm oil, liver oils with a high content of unsaponifiables and Mullet oil, of waxes of vegetable origin as jojoba oil, of mineral oils as liquid paraffin, and of mineral waxes as ozokerite, i. e., mixtures of hydrocarbons. My present invention furthermore relates to fatty acids and fatty matters of mixed compositions. Thus the term "fats, fatty acids and waxes" as used above and in the following claims is intended to cover all substances and materials of the groups listed above.

Of course, also the term "fatty acids" used in the preceding description of my invention is to be understood as broadly as possible and the processes described above might be used also for and in connection with all above mentioned substances and materials.

Thus, for instance, this term is intended to include not only single fatty acids or other substances but also mixtures of such fatty acids and other substances, these mixtures might be purified or unpurified, distilled or undistilled; they might also contain other materials, as for instance, resin acids or the like.

The following examples are illustrative of my process, although it is to be understood that I do not intend to limit myself particularly thereto:

*Example I*

Crude tall oil is intimately mixed with five percent of activated earth, preferably "Retrol," one percent of filtercel, i. e., inactivated kieselgur, two percent of spent nickel-copper catalyst, and one percent of activated carbon. After these additions are finely divided in the tall oil, the temperature of this mixture is raised up to 200° F. and then hydrogen is introduced under pressure of about 250 pounds. Thereafter, the temperature of the mixture is further raised until 225° F. and then maintained at this level for about two hours. During this time, the mixture is agitated in order to obtain intimate contact of the oil with all added bleaching and refining agents and with the hydrogen introduced under pressure.

After maintaining hydrogen pressure for about two hours, the temperature of the oil is lowered and the thus treated oil filtered. Thereafter, the clear filtered oil is stirred in an open vessel and about 0.3% of phosphoric acid having a specific gravity of 1.041 and about 0.1% of monobasic sodium phosphate are added, both said substances well dissolved in water; the pre-treated oil together with these admixtures is then heated up to 200° F. and reacted with the acid and phosphate for at least thirty minutes.

The oil is then settled without stirring for at least thirty minutes and the precipitated greenish nickel and copper soaps are then removed. The thus obtained clear, substantially refined tall oil might then be mixed with about 0.1% of filtercel and filtered.

If the thus cleaned tall oil is to be used as oil without any following hydrogenation, it can be once more treated with fuller's earth and activated carbon. Previous to such treatment, 0.01% of an organic acid like acetic, citric or oxalic acid can be added to remove iron traces; this step will promote the bleaching effect of the subsequent bleaching treatment with fuller's earth and activated carbon.

The pre-treated tall oil can then be hydrogenated. The process steps are similar to the customary ones; the main difference is that a mixed metal catalyst consisting of two-thirds of nickel and one-third of copper is used and that not more than one percent of this catalyst is needed for obtaining excellent hydrogenation results. Furthermore, the hydrogenation is carried out at about 225° F. under a pressure of 750 pounds or somewhat less.

This hydrogenation treatment might be followed by purification of the hydrogenated tall oil in order to remove formed metal soaps, e. g., nickel and copper soaps, colloidal nickel and copper, and iron traces. This is obtained by repeated treatment with about 0.5% of phosphoric acid, about 0.2% of sodium phosphate, followed by subsequent treatment with about 0.02% of an organic acid. This latter step might then be followed by subsequent bleaching with fuller's earth and activated carbon.

*Example II*

Undistilled cotton oil fatty acid is intimately mixed with about one-half percent of activated fuller's earth, one-quarter of a percent of activated carbon, one-half percent of inactivated kieselgur, and one percent of a spent catalyst, preferably a spent nickel-copper catalyst, consisting of two-thirds of nickel and one-third of copper. The thus obtained mixture is then treated in the same way as described above in Example I for refining, bleaching and hydrogenation of tall oil with the only difference that the mixture is subjected to a hydrogen pressure of only fifty pounds.

*Example III*

Undistilled red oil, i. e., commercial oleic acid, is treated in the same way as described in Example II for cotton oil fatty acid.

*Example IV*

Undistilled crude tall oil is hydrogenated without any pre-treatment with a mixed nickel-copper catalyst consisting of two-thirds of nickel and one-third of copper. The hydrogenation steps themselves are identical with those of other customary hydrogenation treatments. The only difference is that by use of the above described new catalyst good hydrogenation results might be obtained also without any purifying pre-treatment in case of certain types of crude tall oil while customary catalysts will not have any hydrogenation effects without pre-treatment of the crude oil.

*Example V*

Crude cottonseed oil, dark colored and still containing its original free fatty acid content is intimately mixed with two percent of spent nickel-copper catalyst and 1% of filtercel, inactivated kieselgur. The temperature of this mixture is raised up to 200° F. and then hydrogen is introduced under pressure of about 250 lbs. This temperature is maintained for about two hours. During this time, the mixture is agitated in order to obtain intimate contact of the oil and its refining reagents and with the hydrogen kept under pressure. The temperature of the mixture is then lowered to about 180° F., the pressure released and the thus treated oil filtered.

The oil is now only caustic refined in the customary way which gives the advantage that the foots thus obtained are much cleaner and more valuable. Less caustic washes are required to obtain a clear, neutral oil which results in decreased refining losses. The neutral oil is refiltered with filtercel or unactivated fuller's earth to remove the last traces of soap.

If the thus cleaned cottonseed oil is to be used as liquid oil it can be treated once more with activated earth and carbons. Previous to such treatment, 0.01% of an organic acid like acetic or citric (not oxalic, because it is toxic for edible oil purposes) can be added to remove iron traces; this step will promote the bleaching effect of the subsequent treatment with activated earth and carbons. The pre-treated oil has better keeping qualities and can be deodorized in the regular way but under savings of steam.

The pre-treated cottonseed oil can also be hydrogenated. The process steps are similar to the customary ones; the main difference is that a mixed metal catalyst consisting of ⅔ of nickel and ⅓ of copper is used and that a small percentage of the catalyst can be reused much more often. Furthermore, the hydrogenation is carried out at about 225° F. under a pressure of 250 lbs. or somewhat less.

This hydrogenation treatment might be followed by purification of the hydrogenated cottonseed oil in order to remove formed metal soaps, e. g., nickel and copper soaps, colloidal nickel and copper and iron traces. This is obtained by a treatment of 0.3% of phosphoric acid having a specific gravity of 1.041 and about 0.1% of monobasic sodium phosphate which are both well dissolved in water and added to the hydrogenated, filtered cottonseed oil. The hydrogenated oil together with these admixtures is then kept under intimate stirring for at least 30 minutes; the temperature is maintained around 180° F. but not less than 150° F. The oil is then settled without stirring for at least 30 minutes and the precipitated greenish nickel and copper soaps are then removed. The thus obtained clear hydrogenated cottonseed oil is mixed with about 0.1% of filtercel and filtered. The oil is then submitted to a short steam deodorisation under vacuum. Citric acid to remove iron traces (0.01%) can be added in this step. The deodorised oil is ready for a first-class shortening with excellent stability and a high smoke point.

*Example VI*

Crude, dark tallow, high in free fatty acid is intimately mixed with ½% spent catalyst and ¼% of filtercel, ¼% activated earth. The temperature of this mixture is raised to 200° F. and then hydrogen is introduced and kept at a pressure of 50 lbs. This temperature is maintained for about two hours. During this time, the mixture is agitated in order to obtain intimate contact of the oil and its refining reagents and with the hydrogen kept under pressure. The temperature of the mixture is then lowered to about 180° F., the pressure released and the thus treated oil filtered.

The oil can be now caustic refined, totally or partially, in the customary way. The neutralized tallow is refiltered with less than ¼% of neutral earth to remove the last traces of soap in case a hydrogenation treatment follows for the purpose of saturation of the double bonds and increase of melting point and titer.

If the thus cleaned tallow is to be used as such without subsequent hydrogenation it can be treated once more with activated earth and carbons. Previous to such treatment, 0.01% of an organic acid like acetic or citric (not oxalic, because toxic for edible oil purposes) can be added to remove iron traces; this step will promote the bleaching effect of the subsequent treatment with activated earth and carbons. The purified tallow has better keeping qualities of color and odor and can be used for high class white, perfumed toilet preparations.

The pre-treated tallow can also be hydrogenated. The process steps are similar to the customary ones; the main difference is that a mixed metal catalyst consisting of ⅔ of nickel and ⅓ of copper is used and that a small percentage of the catalyst can be reused much more often. Furthermore, the hydrogenation is carried out at about 225° F. under a pressure of 250 lb. or somewhat less.

This hydrogenation treatment might be followed by purification of the hydrogenated tallow in order to remove formed metal soaps, e. g., nickel and copper soaps, colloidal nickel and copper and iron traces. This is obtained by a treatment of 0.3% of phosphoric acid having a specific gravity of 1.041 and about 0.1% of monobasic sodium phosphate which are both well dissolved in water and added to the hydrogenated, filtered cottonseed oil. The hydrogenated oil together with these admixtures is then kept under intimate stirring for at least 30 minutes; the temperature is maintained around 180° F. (not less than 150° F.) The oil is then settled without stirring for at least 30 minutes and the precipitated greenish nickel and copper soaps are then removed. The thus obtained clear hydrogenated cottonseed oil is mixed with about 0.1% of filtercel and filtered.

*Example VII*

Crude jojoba oil is intimately mixed with ½% spent catalyst, ¼% of filtercel, ¼% of carbon. The temperature of the mixture being raised to 200 °F. and then hydrogen is introduced and kept at a pressure of 50 lbs. This temperature is maintained for about two hours. During this time the mixture is agitated in order to obtain intimate contact of the oil and its refining reagents and with the hydrogen kept under pressure. The temperature of the mixture is then lowered to about 180° F. and the pressure released and the thus treated oil filtered. Thereafter the clear filtered oil is stirred in an open vessel and about 0.3% of phosphoric acid having a specific gravity of 1.041 are added, both said substances well dissolved in water; the pretreated oil together with these admixtures is then heated up to 200° F. and reacted with the acid and phosphate for at least 30 minutes. The oil is then settled without stirring for at least 30 minutes and the precipitated greenish nickel or nickel-copper soaps are then removed. The thus clear and substantially refined jojoba oil might then be mixed with about 0.1% of filtercel and filtered. The filtercakes of spent catalyst and filtercel from these two filtration steps cannot be reused again.

The pre-treated oil is already light in color and does not require any further purifying step for the majority of cases where it might be used in the liquid form. The pretreated jojoba oil can also be hydrogenated. The process steps are similar to the customary ones; the main difference is that a mixed metal catalyst consisting of ⅔ of nickel and ⅓ of copper is used and that a small percentage of the catalyst can be used for even a complete saturation. Furthermore the hydrogenation is carried out at about 225° F. under a pressure of 250 lbs. or somewhat less.

For the majority of purposes the thus treated and filtered oil will not required any further washing, bleaching nor deodorization treatments. The combined pre-treatment with spent catalyst and the hydrogenation with nickel copper catalyst yield a color- and odorfree hard jojoba oil without any further treatment, which presents itself as a spermaceti-like, crystalline wax.

*Example VIII*

Crude dark mineral oil is intimately mixed with 5% of activated earth, preferably "Retrol," one percent of filtercel, two percent of spent nickel or nickel-copper catalyst and one percent of activated carbon. After these additions are finely divided in the oil the temperature of the mixture is raised up to 180° F. and hydrogen is introduced under pressure of about 750 lbs. The temperature of the mixture is kept under 200° F. for about 2 hours. During this time the mixture is agitated in order to obtain intimate contact of the viscous mineral oil with all added bleaching and refining agents and with the hydrogen introduced under pressure. The thus treated oil is then filtered. The clear filtered oil is stirred in an open vessel and about 0.3% of phosphoric acid having a specific gravity of 1.041 and about 0.1% of monobasic sodium phosphate are added, both said substances well dissolved in water; the pretreated oil together with these admixtures is then heated up to 200° F. and reacted with the acid and phosphate for at least 30 minutes. The mineral oil is settled without stirring for about 30 minutes and the precipitated greenish metal soaps are then removed. The thus obtained clear oil is greatly improved in color and odor and a test will show a sharp decrease in sulphur compounds. The oil is filtered with a small percentage of filtercel and then re-bleached with fuller's earth and activated carbon. Previous to such treatment, 0.01% of an organic acid, like acetic, citric and or oxalic can be added to remove iron traces; this step will promote the bleaching effect of the subsequent bleaching treatment with fuller's earth and activated carbon.

It will be understood that each of the elements described above, or two or more together, may also find a useful application in other types of refining, bleaching and hydrogenating processes differing from the types described above.

While I have described the invention as embodied in certain specific processes for purifying, bleaching and hydrogenating fats, fatty acids and waxes, I do not intend to be limited to the details shown, since various modifications and changes may be made without departing in any way from the spirit of my invention.

Without further analysis, the foregoing will so fully reveal the gist of my invention that others can, by applying current knowledge, readily adapt it for various applications without omitting features that, from the standpoint of prior art, fairly constitute essential characteristics of the generic or specific aspects of this invention and therefore such adaptations should and are intended to be comprehended within the meaning and range of equivalency of the following claims.

What I claim as new and desire to secure by Letters Patent is:

1. In the process of refining a substance selected from the group consisting of fats, fatty acids and waxes, the step of subjecting an intimate mixture comprising said substance to be refined and a small percentage of a finely divided spent hydrogenation catalyst to hydrogen pressure between fifty and seven hundred and fifty pounds per square inch at a temperature slightly above 212° F.

2. In the process of purifying a substance selected from the group consisting of fats, fatty acids, and waxes, the step of subjecting an intimate mixture comprising said substance, activated earth and a spent metal hydrogenation catalyst to hydrogen pressure from 50 to 750 pounds per square inch at a temperature slightly above 212° F.

3. In the process of refining crude tall oil, the step of subjecting an intimate mixture comprising said tall oil, activated earth and a small percentage of a spent metal hydrogenation catalyst to hydrogen pressure between fifty and seven hundred and fifty pounds per square inch at a temperature slightly above 212° F.

4. In the process of refining crude tall oil, the step of subjecting an intimate mixture comprising said tall oil, a small percentage of activated carbon, and a small percentage of a spent hydrogenation catalyst to hydrogen pressure between fifty and seven hundred and fifty pounds per square inch at a temperature slightly above 212° F.

5. In the process of refining crude tall oil, the step of subjecting an intimate mixture comprising said tall oil, and a small percentage of a spent hydrogenation catalyst to hydrogen pressure between fifty and seven hundred and fifty pounds per square inch at a temperature slightly above 212° F.

6. Process of purifying and hydrogenating a fatty acid comprising the steps of intimately mixing said fatty acid with a small percentage of a spent hydrogenation catalyst, raising the temperature of said mixture to slightly above 212° F., introducing hydrogen under pressure of between 50 and 750 pounds per square inch into said mixture, maintaining said mixture under said hydrogen pressure at said temperature while agitating the same, filtering the thus pre-treated mixture, removing thereafter from the thus partly purified mixture traces of metal soaps formed by said treatment, subjecting thereafter said acid to treatment with a small percentage of an organic acid adapted to precipitate iron particles contained in said fatty acid, hydrogenating thereafter the thus purified fatty acid with a mixed nickel-copper catalyst, the copper particles of said catalyst absorbing those impurities of the fatty acid to be hydrogenated which inhibit the catalyst action and the nickel particles of said catalyst freely reacting with the thus purified fatty acid, thereafter removing from the thus hydrogenated fatty acid all traces of metal soaps and iron still left in the same, and finally bleaching the thus obtained purified hydrogenated fatty acid.

7. Process of purifying and hydrogenating a fatty acid comprising the steps of subjecting an intimate mixture comprising said fatty acid, and a small percentage of spent hydrogenation catalyst, a small percentage of at least one bleaching agent selected from the group consisting of activated earth and activated carbon, to hydrogen pressure between fifty and seven hundred and fifty pounds per square inch at a temperature slightly above 212° F., filtering the thus pretreated mixture, removing thereafter from the thus partly purified mixture traces of metal soaps formed by this treatment, removing thereafter from the thus treated mixture iron particles contained in the same, hydrogenating thereafter the thus purified fatty acid with a catalyst comprising from fifty to eighty per cent of nickel and from fifty to twenty per cent of copper, the copper particles of said catalyst absorbing those impurities of the fatty acid to be hydrogenated which inhibit the catalyst action and the nickel particles of said catalyst freely reacting with the thus purified fatty acid, thereafter removing from the thus hydrogenated fatty acid all traces of metal soaps and iron still left in the same, and finally bleaching the thus obtained purified hydrogenated fatty acid.

8. In the process of refining a substance selected from the group consisting of fats, fatty acids and waxes, the step of subjecting said substance to be refined in the presence of a spent hydrogenation catalyst to hydrogen pressure between 50 and 750 pounds per square inch at a temperature slightly above 212° F.

ILONA TAUSSKY.